US00RE37122E

(19) United States
(12) Reissued Patent
Levine et al.

(10) Patent Number: US RE37,122 E
(45) Date of Reissued Patent: Apr. 3, 2001

(54) METHOD AND APPARATUS FOR DISTRIBUTING CURRENCY

(75) Inventors: Jack Levine; Priscilla C. Brandt, both of San Mateo; Nydia Jackson, Redwood City; David L. Johnson, Woodside; Helen Clark, Mill Valley, all of CA (US)

(73) Assignee: Visa International Service Association, Foster City, CA (US)

( * ) Notice: This patent is subject to a terminal disclaimer.

(21) Appl. No.: 09/062,517

(22) Filed: Apr. 17, 1998

Related U.S. Patent Documents

Reissue of:
(64) Patent No.: 5,477,038
Issued: Dec. 19, 1995
Appl. No.: 08/141,772
Filed: Oct. 25, 1993

U.S. Applications:

(63) Continuation of application No. 08/707,733, filed on Sep. 4, 1996, now Pat. No. Re. 36,365.

(51) Int. Cl.[7] ..... G06K 5/00
(52) U.S. Cl. ..... 235/380; 235/379; 902/4; 902/5
(58) Field of Search ..... 235/379, 380, 235/381; 902/4, 5, 25, 27

(56) References Cited

U.S. PATENT DOCUMENTS 4,700,055 * 10/1987 Kashkashian, Jr. ..... 235/380
4,707,592 * 11/1987 Ware ..... 235/380 X
4,766,293 * 8/1988 Boston ..... 235/379
4,837,422 * 6/1989 Dethloff et al. ..... 235/380
5,012,077 * 4/1991 Takano ..... 235/380
5,038,022 * 8/1991 Lucero ..... 235/380
5,068,891 * 11/1991 Mashall ..... 379/91
5,101,098 * 3/1992 Naito ..... 235/379 X
5,206,488 * 4/1993 Teicher ..... 235/380
5,267,149 * 11/1993 Anada et al. ..... 364/408

FOREIGN PATENT DOCUMENTS

0397512 * 11/1990 (EP) .
4-367991 12/1992 (JP) .
7-25459 5/1995 (JP) .
9217856 * 10/1992 (WO) .

OTHER PUBLICATIONS

Prepayment Cards The Electronic Purse Becomes Big Business, Harrop, Peter A Financial Times Management Report, 1991, Chapters 1, 2, 3, 5, 7, 8, and 9. Month missing.
Prepaid Card Developments, Visa International, Visa International Corporate Planning, Jul. 1990, pp. 1–38.
The Electronic Payments International POS Databook by Lafferty Business Research, Aisling Maguire, Lafferty Publications, 1992, Executive Summary pp. I–xxiii, Chapter 1 and Chapter 2, pp. 1–31. Month missing.

(List continued on next page.)

*Primary Examiner*—Michael G Lee
(74) *Attorney, Agent, or Firm*—Beyer Weaver & Thomas, LLP

(57) ABSTRACT

A process which provides electronic access to pre-paid funds for cash or payment for goods and services. A card is issued to a customer with a value selectable by the customer. The card has a magnetic stripe with an encoded card number including a bank identification number (BIN) and an account number. The central card processor establishes a zero balance database including the card numbers, but with blank fields for the customer data and the value of the account. When a customer purchases a card, the sales agent transmits to the central database computer which fills in the blanks in the database, activating the account, and transmits an acknowledgement signal back to the sales agent. The customer can immediately use the card in ATM or other remote terminals to acquire cash or purchase goods and services. The customer inputs a PIN number which is provided with the card, or a customer selected alternative PIN number.

41 Claims, 6 Drawing Sheets

OTHER PUBLICATIONS

Pre–Paid Cards; Svigals, Jerome; Bank Branching 2000, the Next Ten Years; Lafferty Publications; 1990; Reprinted in Cards and Payments, Strategies in Action, vol. 1, Chapter 42; Lafferty Publications; 1994. Month missing.
Magnetic Stripe Versus Chip Card, George Gysels, Banksys, Electronic Payments International, Oct. 1992; Reprinted in Cards and Payments, Strategies in Action, vol. 1, Chapter 44; Lafferty Publications; 1994. Month missing.
Cards 2000, The Coming Revolution In The Cards Market, Chapter 10, Prepaid Cards; Svigals, Jerome; Lafferty Publications, Ltd.; 1993; pp. 95–107. Month missing.
Visa Debit Card, Visa U.S.A., Inc.; 1990. Month missing.
Debit Goes National; Higgins, Kevin T.; Credit Card Management; Feb. 1992; pp. 55, 58, 60 62, 65–67.
After a Series of False Starts, Debit Cards Show Promise; American Banker, Aug. 19, 1992; p. 1; vol. 157, No. 160.
The Banks in Europe Break Down Barriers: Development of Eurocheque and Eurocard Typify Growing Financial Cooperation; American Banker; Jun. 14, 1984, p. 18.
Prepaid Card System For Shopping; Mitsubishi Denko Giho; 1990; vol. 64, No. 7. (English Abstract). Month missing.

* cited by examiner

METHOD AND APPARATUS FOR DISTRIBUTING CURRENCY

Matter enclosed in heavy brackets [ ] appears in the original patent but forms no part of this reissue specification; matter printed in italics indicates the additions made by reissue.

*This application is a continuation of reissue application Ser. No. 08/707,733 filed Sep. 4, 1996, now U.S. Pat. No. Re. 36,365, which is a reissue of U.S. application Ser. No. 08/141,772 filed Oct. 25, 1993, now U.S. Pat. No. 5,477,038.*

BACKGROUND OF THE INVENTION

The present invention relates to systems and processes for dispensing currency to a cardholder in response to an authorization over an electronic data network.

A variety of cards are available to enable a customer to electronically interface with a financial institution. Credit cards are a well-known example of this, plastic cards having a magnetic stripe with an encoded account number. These cards can be read by special terminals at a merchant's site, commonly referred to as point-of-sale (POS) terminals. The account number can then be transmitted over a network, such as the VisaNet network. In addition to the account number, the amount of the transaction is also transmitted for authorization. A remote main-frame computer checks a database to determine if the credit card customer is still within his/her credit limit, before authorizing the purchase.

Another type of card is a debit card, which is not used to extend credit, but rather to withdraw cash or pay a merchant immediately. The amount of the transaction is deducted from the customer's checking account, which the customer can periodically replenish. Here, the customer must have the money in the account before the transaction is approved, rather than having to pay the money on credit extended, as for a standard credit card.

Another type of card is an automated teller machine (ATM) card. These are typically issued by a particular financial institution or bank, allowing a customer to access the customer's checking or savings account for withdrawal from a remote ATM. The remote ATM is connected through an ATM interchange to various banks subscribing to a particular ATM network. Like a debit card, this card causes an immediate deduction from the customer's account. The immediate deduction is actually a same day or same night deduction, since the amount of the transaction is typically recorded, and then actually processed in batch mode at night with other transactions. One danger of the ATM system is that of a lost or stolen card. The use of a Personal Identification Number (PIN), known only to the customer, eliminates much of the risk. Another control is imposing a daily limit, $200, for instance, on any withdrawals by a particular card during any day.

Other types of cards store the account amount directly on the card. An example would be a transit card, such as cards for the Bay Area Rapid Transit (BART) District. When these cards are purchased, the dollar amount of the card is magnetically recorded on the card. Each time the card is used by passing it through an access terminal, the fare is deducted from the amount on the card, and a new card value is magnetically recorded on the card itself. An advantage of such a card is that if it is lost or stolen, the potential loss value is only the amount recorded on the card itself. A disadvantage is that there is no ability to contact the issuer and freeze the remaining account balance.

Other than these different types of cards, and currency itself, there is yet another device for obtaining cash which is very popular. That is the paper travellers cheque. Travellers cheques are desirable as compared to currency because of the signature authorization required and the ability to report them as stolen or lost and identify them by serial number. In addition, they are issued in limited amounts, and thus may limit the possible exposure. Unlike debit cards or credit cards or even ATM cards, there is no account number which can easily be verified online to see if the account has been closed.

SUMMARY OF THE INVENTION

The present invention provides an electronic cash access process which includes a unique combination of aspects of both debit cards and travellers cheques, referred to herein as an Electronic Travellers Cheque (ETC). The process can also be used for money transfer and any other pre-paid cash access product. A card is issued to a customer with a value selected by the customer. Unlike a credit or debit card, the value is fixed. Unlike a transit card, the amount of the value of the card is stored in a central computer. The card can be used to access the account through an ATM or other terminals world-wide, with the use of a personal identification number (PIN) to provide added security greater than that, for instance, given by the signature on a traditional paper travellers cheque. The card is disposable when the account is depleted, with a new card and account required for a new amount of cash.

The cards themselves have a magnetic stripe with an encoded card number including a bank identification number (BIN) and an account number. The cards may be issued by multiple ETC issuers who have financial responsibility for the accounts, but are processed on their behalf by a single entity referred to as the ETC processor herein. The ETC processor establishes a zero balance database including the card numbers, but with blank fields for the customer data (name, address, etc.) and the value of the card. The cards are provided to a bank or other sales agent. When a customer purchases a card, the sales agent uses local software to remotely transmit to the central database the card number (or a serial number) along with the customer data and the amount purchased. The software at the ETC processor fills in the blanks in the database, activating the account, and transmits an acknowledgement signal back to the sales agent software.

The customer can immediately use the card in ATM or other remote terminals to acquire cash or purchase goods or services. The customer inputs a PIN number which is provided with the card, or a customer selected alternative PIN number. The transaction is handled by the ATM or other terminal in much the same manner as a normal ATM transaction using an ATM card.

When the cards are manufactured, they preferably have a serial number printed on them which is different from the card number recorded on a magnetic stripe on the card. The sales agent would actually preferably transmit the serial number over the data link to the ETC processor for added security. In addition, the agent will transmit an agent identification number. The ETC processor verifies that the agent is authorized to sell a particular serial number, and translates the serial number into the appropriate card number, including the BIN number and account number. The remote computer can then determine a location in the database to be loaded with the account information.

The BIN number of the issuing institution is stored in the database in the ETC processor along with an indication of the currency used for issuance. A particular bank may have multiple BIN numbers for multiple types of currencies in which cards can be issued. When a customer uses the card in a remote terminal, that terminal may be connected to an intermediate network, such as the VisaNet network. The currency of the terminal is transmitted to the central VisaNet computer, and the central VisaNet computer does a currency conversion, if necessary, to debit the account balance.

The serial number provides an additional level of security. The sales agent can transmit the serial number, making it more difficult for someone to intercept the message and determine the account number. Also, a customer can select or change the PIN from any touch tone phone by using the serial number printed on the card. In addition, the central database has fields for storing status information indicating that certain serial number cards have been ordered from the manufacturer, shipped to the sales agent, and received by the sales agent. This information can be accessed by standard inventory software to track it and keep it current for security to insure an agent is authorized to sell a particular serial number card.

For a fuller understanding of the nature and advantages of the invention, reference should be made to the ensuing detailed description taken in conjunction with the accompanying drawings.

DESCRIPTION OF THE PREFERRED EMBODIMENT

Figure 1:
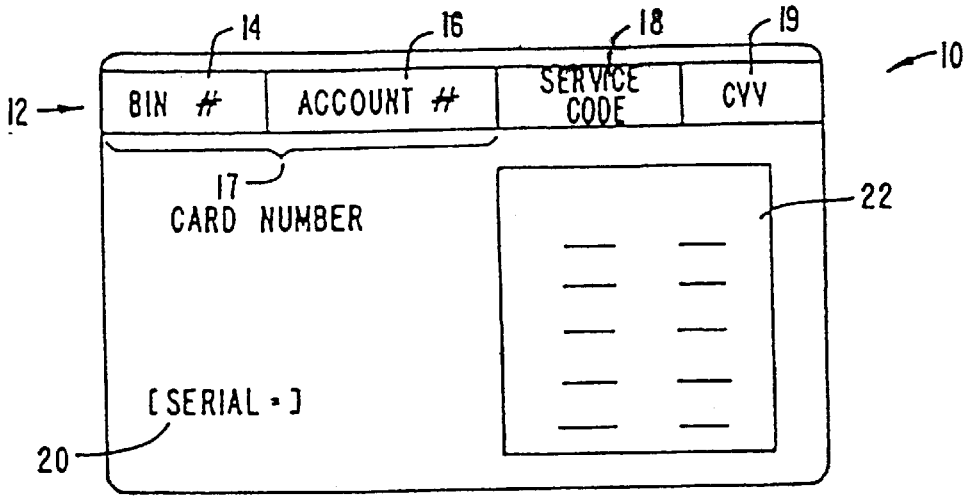
FIG. 1 is a diagram of an ETC card according to the present invention.

FIG. 1 is a diagram of an ETC card 10 according to the present invention. The card has a magnetic stripe 12 on it, including the account information. The magnetic stripe has encoded on it first a bank identification number (BIN) 14. This number not only defines the issuing bank, but also the currency in which the card was issued. If a bank issues only in U.S. currency, it might have just a single number, while a bank which issues in multiple currencies might have multiple BIN numbers assigned. A second number is the actual account number 16 for the particular card. The BIN and account number form a card number 17, sometimes also referred to as a Primary Account Number (PAN). A third number is a service code number 18 which identifies to the appropriate software that this is a "cash only" use card. An alternate service code could be used for authorizing the card for debits for a purchase at a merchant's site in a point of sale (POS) device. Finally, a Card Verification Value (CVV) 19 is used for error detection and fraud detection.

The card also includes a serial number 20 printed on the face of the card to be visible to a sales agent. The serial number can be related by the computer to the encoded account number, which is not itself visible. Finally, a memo pad 22 is included on the card, with multiple lines for a customer to write on to indicate the current balance on the card. As each withdrawal is made with the card, the customer can indicate the remaining balance by subtracting the amount withdrawn from the previous balance and writing it on the card. The card is not embossed to prevent its use as a credit or debit card. Fraud possibilities are thus limited because it cannot be used to produce imprints like a credit card or debit card. There is no need for an expiration date as for a credit card since there is no need for credit controls because the money has already been received by the issuer. However, an expiration date (which may be a long time in the future) may be encoded on the magnetic stripe so it will be compatible with ATM and other terminals that expect to see an expiration date to accept a card.

Figure 2:
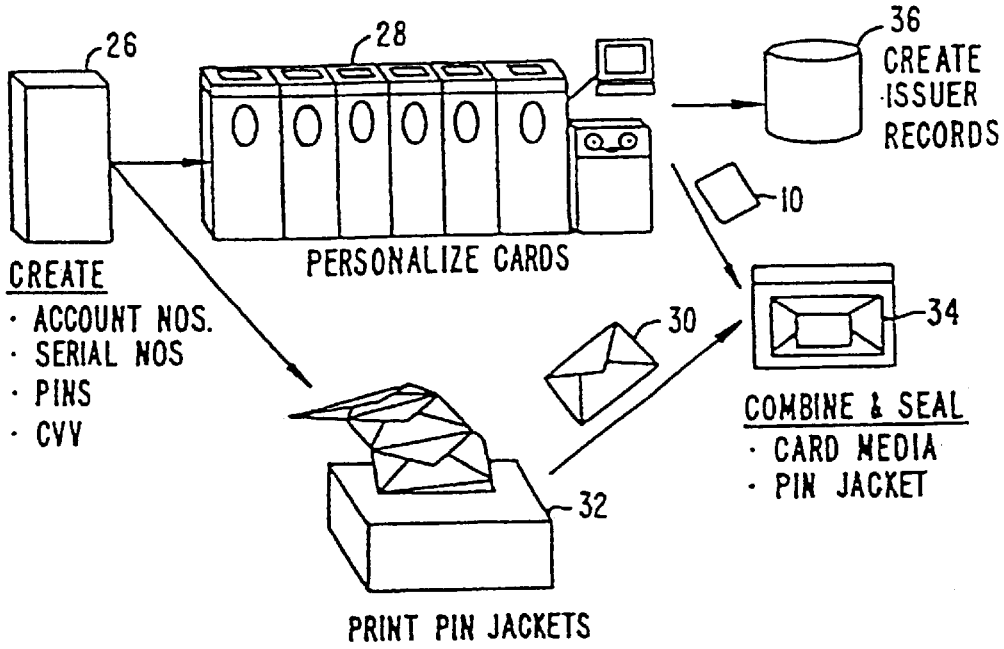
FIG. 2 is a diagram illustrating the production of the card of FIG. 1.

FIG. 2 is a diagram illustrating the actual creation of the cards. A series of blank cards 26 are provided to card personalizing machinery 28. Machinery 28 encodes on the magnetic stripe on the card the card number (the BIN number and the account number), the service code and the CVV number. In addition, the serial number is printed on the card, with the finalized card 10 coming out of the output of the machine. At the same time, a printed envelope or jacket 30 is produced from a printer 32. The envelope 30 will include in it a personal identification number (PIN). The card is placed in its corresponding envelope to produce a combined media and pin jacket 34. A record of the BIN, account and other numbers is stored in an issuer record database 36. A number of card packages 34 can be provided for the inventory of a particular sales agent for sales to end customers.

Figure 3:
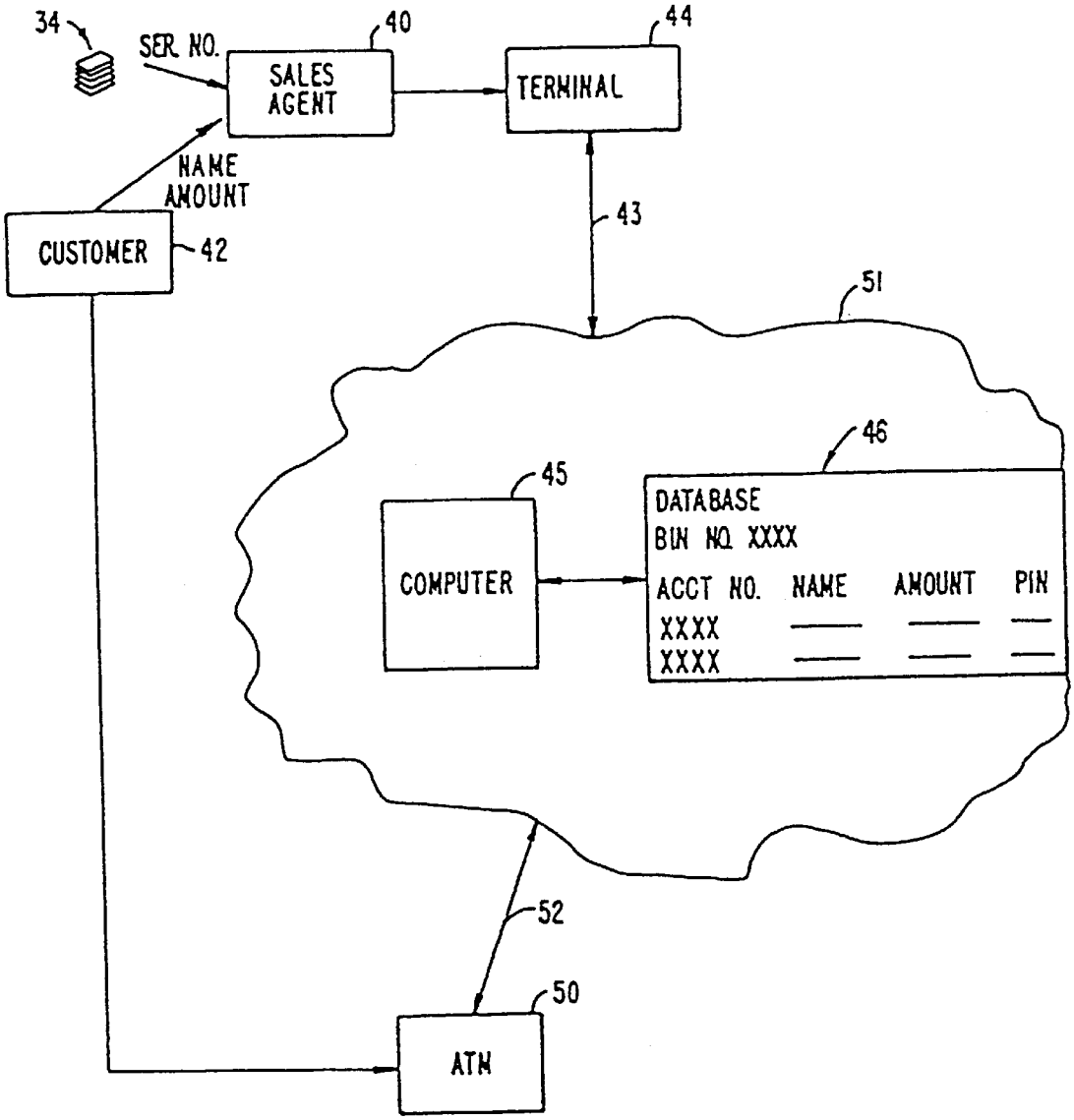
FIG. 3 is a simplified block diagram illustrating the issuance and use of the electronic travellers cheque (ETC) of the present invention.

FIG. 3 is a diagram illustrating the activation and use of the ETC cards at a broad level. A sales agent 40 has a stack of packaged cards 34 in inventory. A customer 42 can approach the sales agent, indicating the customer's name and other identifying information, along with the amount of value desired. The sales agent selects an ETC card and enters its serial number into a terminal (which could be a telephone) 44, along with the customer data and amount. The terminal then transmits this information via communications link 43 to a network such as the VisaNet network 51 (as used herein, VisaNet network refers to the combination of the hardware, software and other elements which comprise the network). The sales agent will also transmit a sales agent code and password. The sales agent code will identify the agent or financial institution. If the sales agent is authorized to issue multiple currencies, a code for the appropriate currency desired by the customer is used.

A database 46 in a main-frame computer 45 looks up the BIN and then the account number for that serial number in a database 46. The database will include blanks for the customer data and amount next to each account number, which will be filled in by the information provided. The computer will then send an acknowledgement message back to the sales agent, who will print a receipt for the customer and complete the transaction.

The customer can then go to any Visa ATM 50 to use the card. ATM 50 is connected to the VisaNet network via communications link 52. The data transmitted by the ATM includes the card number and the amount of the currency the customer wishes to withdraw. This currency amount is compared to the amount stored in the database for that card number. If sufficient value is authorized, the withdrawal is authorized by return message. The VisaNet computer provides any currency conversion needed, since the ATM will transmit a code indicating the currency it dispenses and the database will know the currency of the card from the BIN number for that card number stored in its database.

The account number for the ETC card is not an account of the sales agent or bank. Instead, it is an account maintained with the ETC issuer. Thus, no preexisting account relationship with the bank or sales agent is required. In addition, the issuing procedure for the ETC card results in instant activation of the account and the card. The customer can literally walk to a Visa ATM outside the bank issuing the card and use the ETC card immediately.

Figure 4:
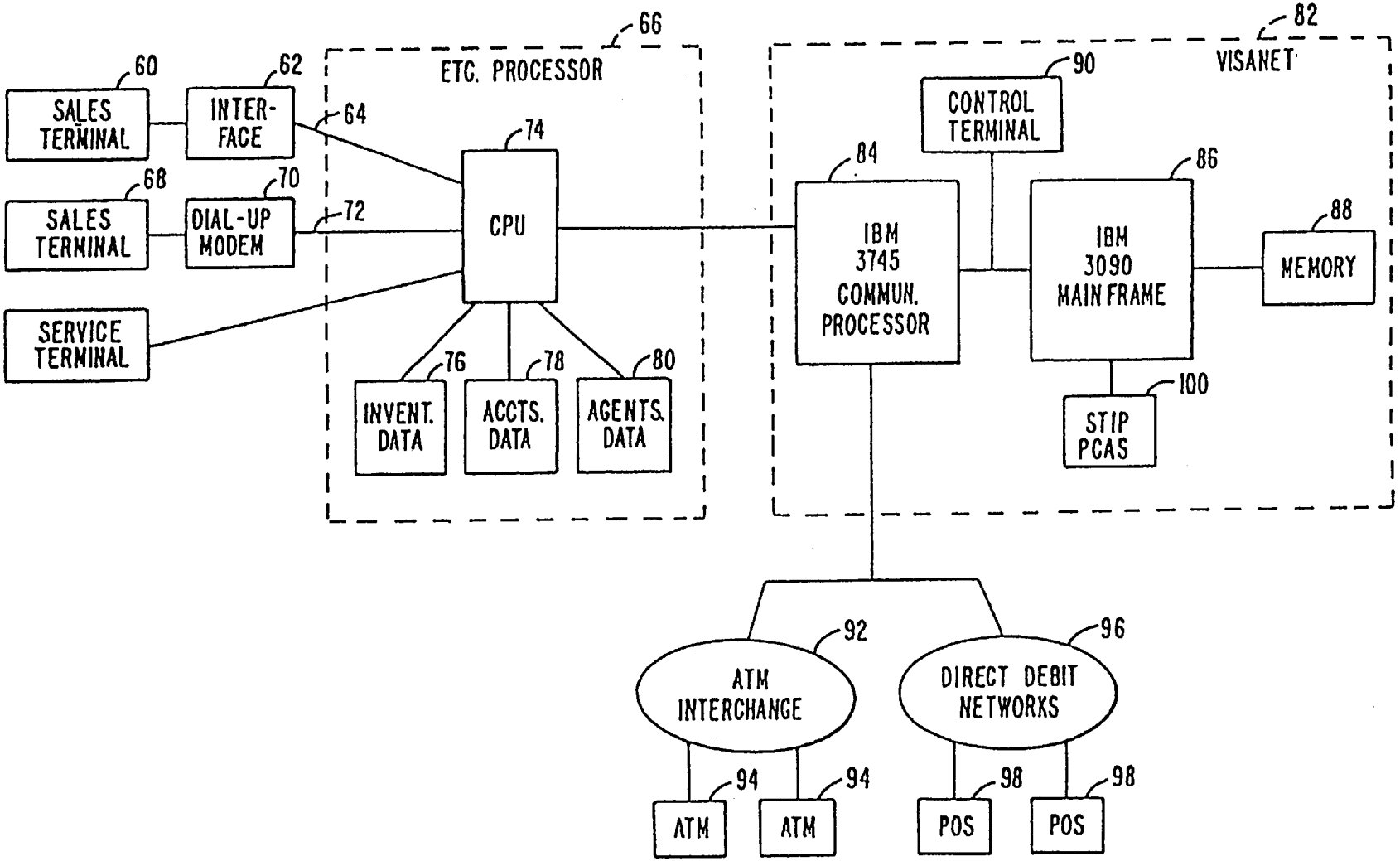
FIG. 4 is a block diagram of the data network used by the present invention.

FIG. 4 is a more detailed block diagram of an electronic network used by the present invention. A first sales terminal 60 is shown connected through an interface 62 to a communication line, such as a digital T1 line 64 to an ETC processor 66. A second sales terminal 68 at a separate bank or sales agent is connected through a dial-up modem 70 to a public packet-switched network communication link 72 to ETC processor 66. The ETC processor includes a computer 74 connected to an inventory database 76, an account database 78, and an agent database 80. The account database 78 stores the account information which is updated each time a customer uses the ETC card.

ETC processor 66 is connected to a network, such as VisaNet network 82. VisaNet network 82 includes a central computer with a communication processor 84, such as an IBM 3745. The communication processor 84 is connected to a main-frame 86, such as an IBM 3090. A memory 88 provides storage for main-frame 86. A control terminal 90 allows for local servicing and control.

Communication processor 84 is connected to an ATM interchange 92, which in turn is connected to individual ATM machines 94. In addition, the communication processor 84 may be connected to a direct-debit network 96, which is connected to individual point-of-sale (POS) terminals 98.

In operation, when a card is used at an ATM 94, a message is passed through ATM interchange 92 to VisaNet network 82. The VisaNet network determines the destination, then forwards the message to the ETC processor for authorization and debiting of the account balance. The return message is passed from ETC processor 66, through VisaNet network 82 and ATM interchange 92 to the individual ATM machine 94, which can now dispense cash to the customer.

Another VisaNet service is stand-in processing (STIP) software 100, typically used when a connected processor is not available. This STIP software includes positive cardholder authorization service (PCAS) software which can do card number verification, PIN verification, and balance verification, if desired.

Figure 5:
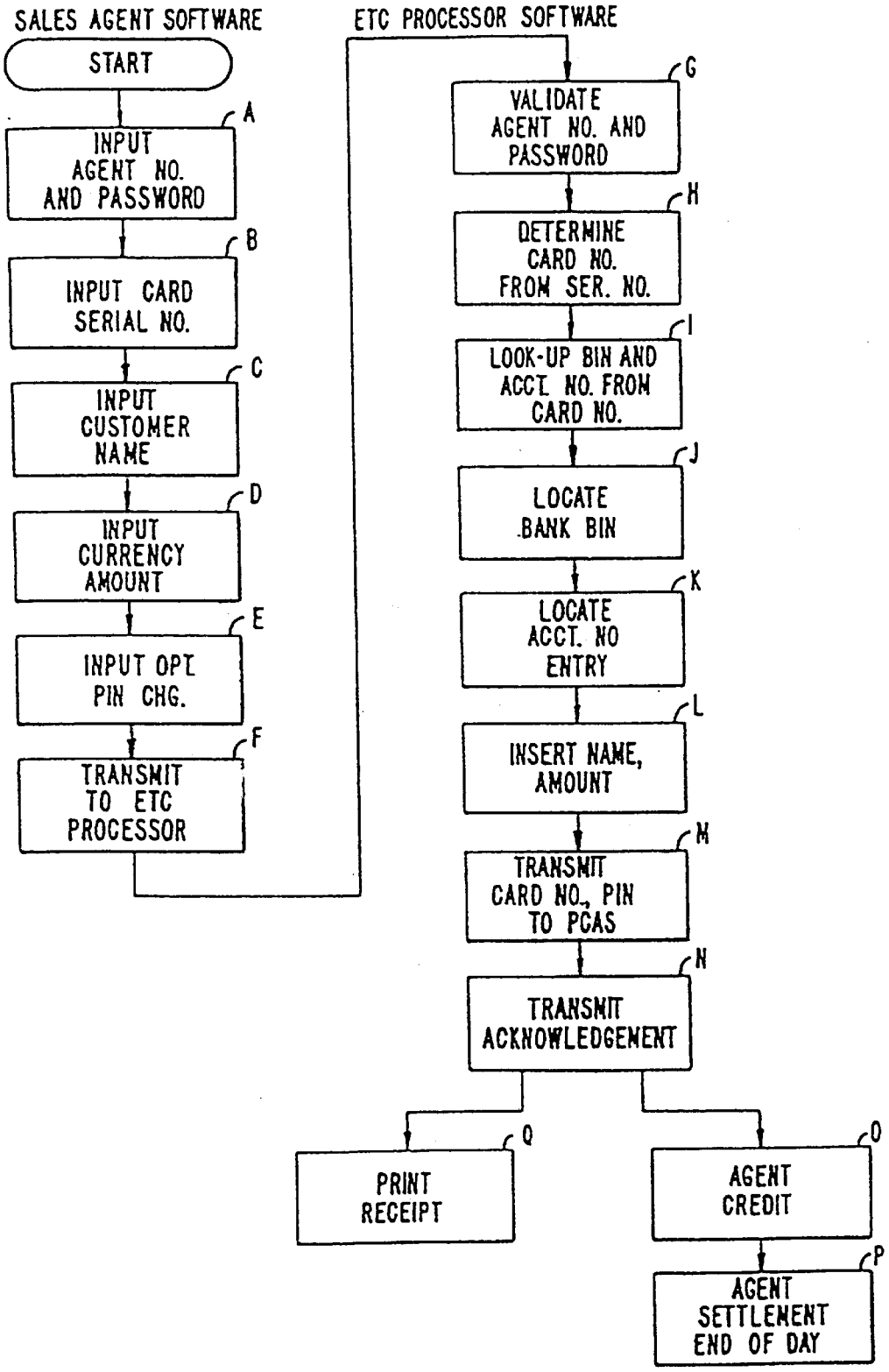
FIG. 5 is a flowchart illustrating the program steps for issuance and activation of an ETC.
Figure 8:
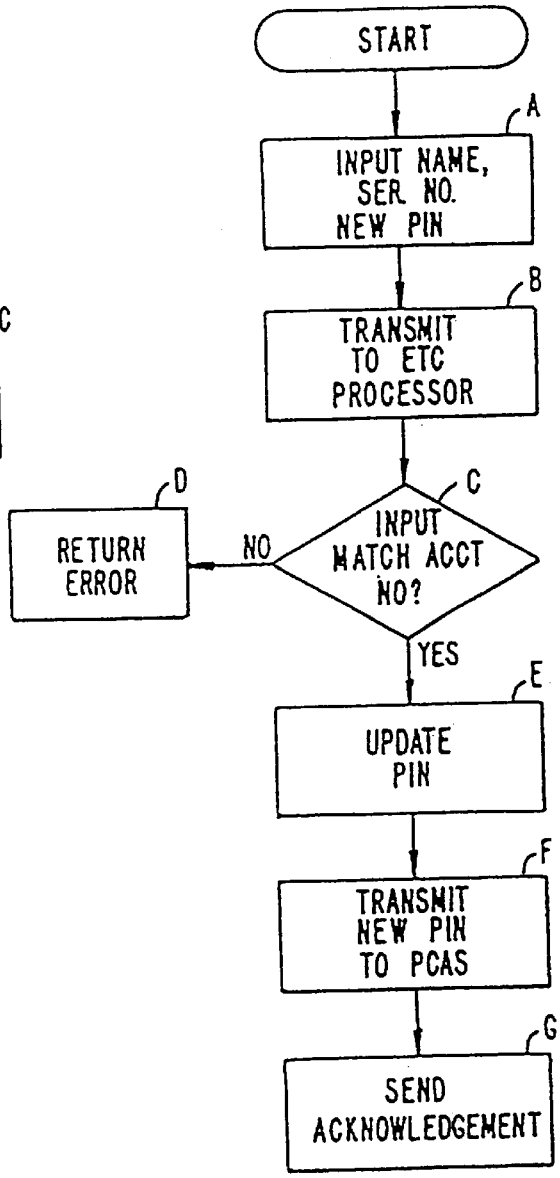
FIG. 8 is a flowchart illustrating a program for assigning a replacement PIN.

FIG. 5 is a flowchart illustrating the operation of the software at the sales agent's terminal in conjunction with the software at the ETC processor. The sales agent first inputs an agent number and an agent password (step A). Next, the card serial number is input (step B). The customer data and the currency amount are also input (steps C and D). Finally, the customer may optionally select a PIN number other than the one preassigned, if the sales agent has this capability (step E). Alternately, the customer may change the PIN at a touch-tone phone as shown in FIG. 8, discussed below. This information is then transmitted to the ETC processor via the datalink (step F).

The software at the ETC processor, upon receiving the transmitted data, first validates the agent number and password by comparing it to the database 80, shown in FIG. 4, of authorized agents and passwords (step G). A translation table is then consulted to determine the card number from the serial number (step H). The card number is used to find the appropriate BIN and account number records in the database (step I).

The account database is consulted, looking up the entries corresponding to that issuer BIN (step J). Once that sector of the database is located, the particular account number is located (step K). The inventory status data stored with the account number is checked to determine if the serial number received was distributed to that sales agent. The customer data and currency amount is then entered into the blank fields corresponding to that account number in the database (step L). The account number and the PIN number stored in the database (or a new PIN number transmitted by the customer) are then transmitted to the VisaNet system for updating of the PCAS software (step M). Finally, an acknowledgement message is sent back to the sales agent (step N).

The software at the ETC processor also calculates an agent commission, if any (step 0). This is stored in the database, with a settlement routine (step P) being run at the end of the day. Finally, back at the agent terminal, the agent terminal software, upon receipt of the acknowledgement message from the ETC processor, prints a customer receipt (step Q).

The use of a serial number separate from the card number allows a customer to securely use a touch-tone phone to change a PIN by transmitting the identifying serial number. A customer can access customer service software through a touch-tone phone for this purpose. The customer could also be required to transmit other customer data, to enable a check of the database to confirm that customer data is associated with that serial number or corresponding card number.

The status data maintained in the account database allows additional security for card inventory. In one embodiment, a first status field is used to indicate when the issuer has placed an order with the card manufacturer to create more cards. A second status field indicates an acknowledgement from the card manufacturer that the cards have been made and shipped to a particular sales agent. A third status field is used to indicate an acknowledgement from that sales agent of receipt of the cards. Thus, a multiple point check is built into the database. Using the account database to store this inventory information also allows simple inventory software to be used, and integrates the inventory security requirements (unique to this type of a card) with the rest of the system.

Figure 6:
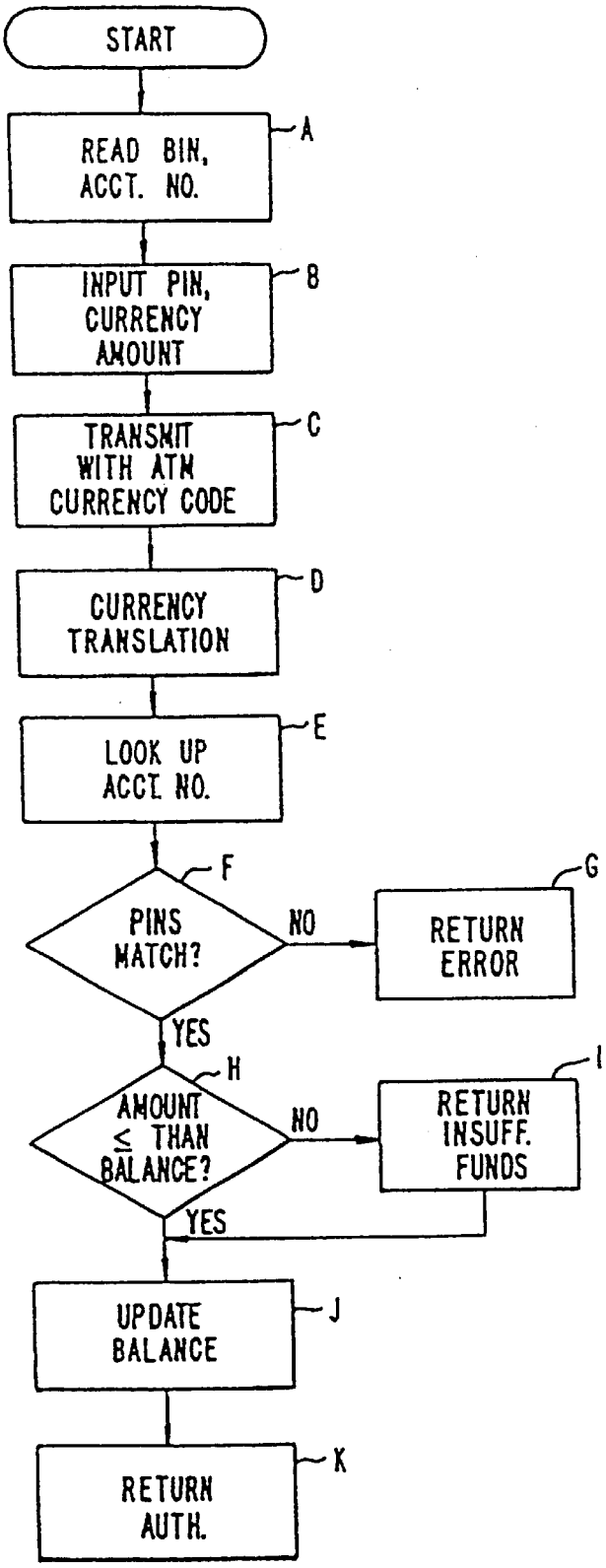
FIG. 6 is a flowchart illustrating a software program for controlling the usage of an ETC.

FIG. 6 is a flowchart illustrating the software used when a customer actually uses the card after issuance. The customer can insert the card into a standard Visa ATM machine (alternately, a POS or other device may be used). The ATM machine software causes the magnetic stripe to be read and determines the card number, including the BIN number and account number from the card (step A). The customer then inputs the PIN number, which the software also captures (step B). Finally, the customer inputs the desired debit amount to be withdrawn (step B).

The local ATM software then transmits a message to the VisaNet system with the input information (step C). The ATM also transmits a currency code which shows what currency is in the ATM. The VisaNet network performs any required currency translation (step D). The ETC processor software then looks up the card number in the database (step E), and the PIN number associated with the account in the database is compared to the transmitted PIN number (step F). If the PINs don't match, a return error message is transmitted to the ATM (step G).

If the numbers do match, the debit amount is then compared to the amount remaining in the account (step H). If there is insufficient funds, an error message is returned to the ATM indicating insufficient funds (step I). If sufficient funds are available, the software then updates the balance for that account after the debit (step J), and an authorization approval message is returned to the ATM (step K).

Figure 7:
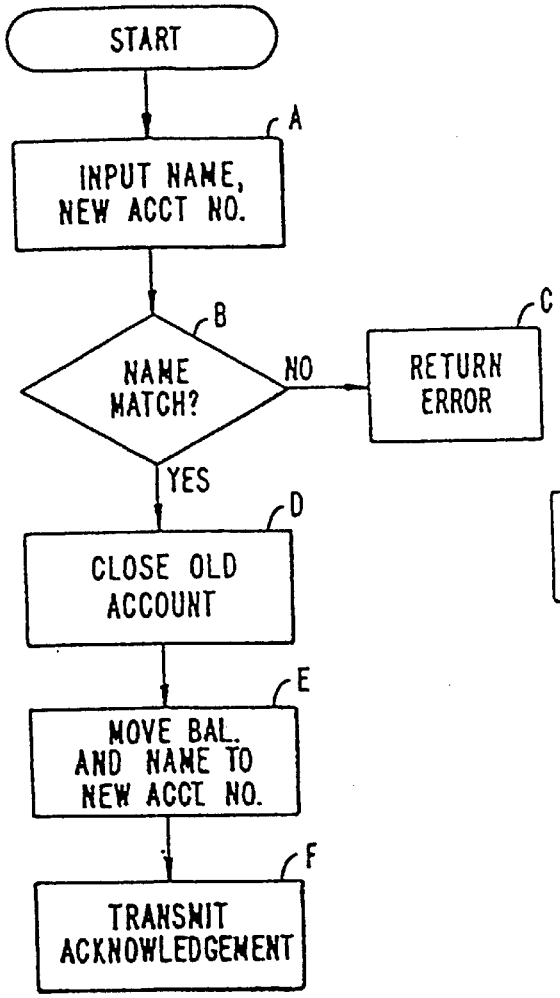
FIG. 7 is a flowchart illustrating a software program for controlling replacement card issuance.

FIG. 7 illustrates a software routine used by a service center to issue a new card when a customer has lost the card. The service agent first inputs the customer name and other data along with a new account number corresponding to a new card, just as in the new card routine (step A). This is transmitted to the ETC processor, which then does a lookup of the account, matching the customer name and other data to verify ownership of the account. If the card number or card serial number are available, these can be used instead (step B). If there is no match, an error message is returned (step C).

If the customer name and other data matches to verify account ownership, the old account is closed (step D). The amount of the old balance is then transferred to the new account, along with the customer name and any other identifying information (step E). An acknowledgement message is then transmitted back to the service agent (step F). The other aspects of the card issuance set forth in FIG. 5 are also followed, with FIG. 7 setting out the new steps required for transfer from one account to another. As can be seen, a lost card can thus have the account closed, rendering it useless. This is an advantage over a paper travellers cheque, which could be forged.

FIG. 8 illustrates the operation of the service agent software for assigning a new PIN number where a customer desires a new PIN or has forgotten the PIN number. The service agent first inputs the customer name and any other identifying data that is available, along with the desired new PIN number (step A). The old PIN could also be required, except for a lost PIN. This information is then transmitted to the ETC processor computer (step B). The ETC processor computer compares the account information to determine whether there is sufficient information to claim that account (step C). If there is insufficient or non-matching information, an error message is returned (step D).

Otherwise, the PIN number assigned to that account is updated (step E). The new PIN number is also transmitted to the PCAS issuer record database in the VisaNet system for updating as well (step F). Finally, an acknowledgement message is returned to the service agents software (step G).

As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims.

What is claimed is:

[1. A method for distributing currency or purchasing goods and services, comprising the following steps:

generating a plurality of card numbers, each card number including an account number and a bank identification number, corresponding to card numbers encoded on a plurality of cards;

creating a database on a central computer having at least a first field for said bank identification number, a second field for said account number, a third field for customer data, a fourth field for a currency amount, and a fifth field for a personal identification number (PIN);

loading said bank identification number and said account numbers into said database, leaving said third and fourth fields without customer data or currency amount;

receiving, at a subsequent time of card purchase, customer data, an ID number corresponding to a card number and a currency amount selected by a customer from a first remote terminal;

immediately entering said customer data and said currency amount into said third and fourth fields, respectively, of said database corresponding to a bank identification number and an account number included in said card number;

immediately entering a personal identification number (PIN) into a fifth field of said database corresponding to said customer;

subsequently receiving, from a second remote terminal, a customer inputted PIN, a card number from a card for said customer and a debit currency amount;

subtracting said currency debit amount from the currency amount in said database corresponding to the received customer card number and PIN and updating said currency amount in said database;

transmitting to said second remote terminal an authorization message for transferring said currency debit amount if said currency debit amount is not greater than said currency amount in the database;

transmitting to said second remote terminal a message denying the transferring of currency if said currency debit amount is greater than the currency amount in the database.]

[2. The method of claim 1 further comprising the steps of:

transmitting, from said second remote terminal, a currency code indicating a currency type in said second remote terminal;

comparing said currency type to an issuance currency of said card indicated by said bank identification number; and converting said debit currency amount of said currency type to said issuance currency.]

[3. The method of claim 1 further comprising the steps of:

printing a serial number different from said card number on each of said cards;

transmitting said serial number as said ID number; and converting said serial number into said card number.]

[4. The method of claim 1 further comprising the steps of:

storing inventory control status information in said database to indicate the status of said cards;

receiving a sales agent ID with said ID number for said card;

comparing said sales agent ID with said inventory control status information;

returning an error message if said comparing step does not produce a match.]

[5. The method of claim 4 wherein said inventory control status information includes first data indicating the ordering of cards by an issuer, second data indicating the shipment of cards by a card manufacturer and third data indicating the receipt of cards by said sales agent.]

[6. The method of claim 1 further comprising changing said PIN according to the steps of:

receiving a new PIN and said ID number;

locating a card number corresponding to said ID number in said database; and replacing the PIN in said fifth field for said card number with said new PIN.]

[7. A method for distributing currency or purchasing goods and services, comprising the following steps:

generating a plurality of card numbers, each card number including an account number and a bank identification number, corresponding to card numbers encoded on magnetic stripes on a plurality of cards;

printing a visible serial number, different from, but related to, said card number, on each of said cards;

creating a database on a central computer having at least a first field for said bank identification number, a second field for said account numbers, a third field for customer data, and a fourth field for a currency amount;

loading said bank identification number and said account numbers into said database, leaving said third and fourth fields without customer data or currency amount;

storing inventory control status information in said database to indicate the status of said cards;

receiving, at a subsequent time, customer data, the serial number and a currency amount from a first remote terminal;

receiving a sales agent ID with said serial number for said card;

immediately translating said serial number into a card number;

immediately entering said customer data and said currency amounts into said third and fourth fields, respectively, of said database corresponding to a bank identification number and an account number included in said card number;

immediately entering a personal identification number (PIN) into a fifth field of said database corresponding to said customer;

comparing said sales agent ID with said inventory control status information;

returning an error message if said comparing step does not produce a match;

subsequently receiving, from a second remote terminal, a customer inputted PIN, a card number from a card for said customer and a debit currency amount;

subtracting said currency debit amount from the currency amount in said database corresponding to the received customer card number and PIN and updating said currency amount in said database;

transmitting to said second remote terminal an authorization message for transferring said currency debit amount if said currency debit amount is less than said currency amount in the database; and transmitting to said second remote terminal a message denying the transferring of currency if said currency debit amount is greater than the currency amount in the database.]

[8. A system for distributing currency or purchasing goods and services, comprising:

means for generating a plurality of card numbers, each card number including an account number and a bank identification number, corresponding to card numbers encoded on a plurality of cards;

a database on a central computer having at least a first field for said bank identification number, a second field for said account numbers, a third field for customer data, and a fourth field for a currency amount, said bank identification number and said account numbers being loaded into said database, leaving said third and fourth fields without customer data or currency amount, and a fifth field for a personal identification number (PIN);

a first remote terminal for transmitting customer data, and ID number corresponding to a card number and a currency amount;

means for entering said customer data and said currency amounts into said third and fourth fields, respectively, of said database corresponding to a bank identification number and an account number included in said card number and entering the PIN into said fifth field of said database corresponding to said customer;

a second remote terminal for transmitting a customer inputted PIN, a card number from a card for said customer and a debit currency amount;

means for subtracting said currency debit amount from the currency amount in said database corresponding to the received customer card number and PIN and updating said currency amount in said database;

means for transmitting to said second remote terminal an authorization message for transferring said currency debit amount if said currency debit amount is not greater than said currency amount in the database;

means for transmitting to said second remote terminal a message denying the transferring of currency if said currency debit amount is greater than the currency amount in the database.]

[9. A method for distributing currency or purchasing goods and services, comprising the following steps:

generating a plurality of card numbers, each card number including an account number and a bank identification number, corresponding to card numbers encoded on a plurality of cards;

creating a database on a central computer having at least a first field for said bank identification number, a second field for said account number, a third field for customer data, a fourth field for a currency amount, and a fifth field for a person identification number (PIN);

loading said bank identification number and said account number into said database, leaving said third and fourth fields without customer data or currency amount;

receiving at a subsequent time of card purchase, customer data, an ID number corresponding to a card number and a currency amount selected by a customer from a first remote terminal;

immediately entering said customer data and said currency amount into said third and fourth fields, respectively, of said database corresponding to a bank identification number and an account number included in said card number;

immediately entering a personal identification number (PIN) into a fifth field of said database corresponding to said customer;

subsequently receiving, from a second remote terminal, a customer inputted PIN, a card number from a card for said customer and a debit currency amount;

subtracting said currency debit amount from the currency amount in said database corresponding to the received customer card number and PIN and updating said currency amount in said database;

transmitting to said second remote terminal an authorization message for dispensing said currency debit amount to the customer if said currency debit amount is less than said currency amount in the database;

transmitting to said second remote terminal a message denying the dispensing of currency if said currency debit amount is greater than the currency amount in the database; and disposing of said card when the currency amount in the database is depleted and deactivating the account corresponding to said card number.]

[10. A method for distributing currency or purchasing goods and services, comprising the following steps:

generating a plurality of card numbers, each card number including an account number and a bank identification number, corresponding to card numbers encoded on a plurality of cards;

creating a database on a central computer having at least a first field for said bank identification number, a second field for said account number, a third field for customer data, a fourth field for a currency amount, and a fifth field for a personal identification number (PIN);

loading said bank identification number and said account numbers into said database;

loading customer data and a fixed currency amount into said third and fourth fields, respectively, of said database corresponding to a bank identification number and an account number included in said card number;

entering a personal identification number (PIN) into a fifth field of said database corresponding to said customer;

subsequently receiving, from a second remote terminal, a customer inputted PIN, a card number from a card for said customer;

subtracting a currency debit amount from the currency amount in said database corresponding to the received customer card number and PIN and updating said currency amount in said database;

transmitting to said second remote terminal an authorization message for transferring said currency debit amount if said currency debit amount is in the database;

transmitting to said second remote terminal a message denying the transferring of currency if said currency debit amount is not in the database.]

[11. The method of claim 10 further comprising the step of dispensing currency to said customer if said currency debit amount is in the database.]

*12. A method for creating a customer account for distributing currency or purchasing goods and services, comprising the following steps:*

*generating a plurality of card numbers, each card number including an account number corresponding to card numbers encoded on a plurality of cards;*

*loading said account number into a database having a plurality of fields, including fields for said account number, for customer data, and for currency amount, leaving said fields for customer data and currency amount without customer data or currency amount;*

*receiving, at a subsequent time of card purchase, customer data, an ID number corresponding to a card number and a currency amount selected by a customer, from a first remote terminal;*

*entering said customer data and said currency amount into said fields of said database for said customer data and said currency amount, respectively, corresponding to an account number included in said card number.*

*13. The method of claim 12 further comprising the steps of:*

*subsequently receiving, from a second remote terminal, a card number from a card for said customer and a currency debit amount;*

*transmitting to said second remote terminal an authorization message for transferring said currency debit amount if said currency debit amount is not greater than said currency amount in said database;*

*subtracting said currency debit amount from the currency amount in said database corresponding to the received customer card number and updating said currency amount in said database.*

*14. The method of claim 13 further comprising the steps of:*

*transmitting, from said second remote terminal, a currency code indicating a currency type in said second remote terminal;*

*comparing said currency type to an issuance currency of said card;*

*converting said debit currency amount of said currency to said issuance currency.*

*15. The method of claim 12 wherein said card number comprises a bank identification number.*

*16. The method of claim 12 wherein said plurality of fields of said database includes a field for a bank identification number.*

*17. The method of claim 12 wherein said step of receiving from a second remote terminal a card number and a currency debit amount includes the step of receiving a personal identification number from said second remote terminal.*

*18. The method of claim 12 further comprising the steps of:*

*printing a serial number different from said card number on each of said cards;*

*transmitting said serial number as said ID number;*

*converting said ID number to said card number.*

*19. A system for distributing currency or purchasing goods and services, comprising:*

*means for generating a plurality of card numbers, each card number including an account number, corresponding to card numbers encoded on a plurality of cards;*

*a database on a central computer having a plurality of fields, including fields for said account number, for customer data, and for currency amount, said account number being loaded into said database, leaving said fields for customer data and currency amount without customer data or currency amount;*

*a first remote terminal for transmitting customer data, an ID number corresponding to a card number and a currency amount;*

*means for entering said customer data and said currency amount into said fields of said database for said customer data and said currency amount, respectively, corresponding to an account number included in said card number.*

*20. The system of claim 19 further comprising:*

*a second remote terminal for transmitting a card number from a card for said customer and a debit currency amount;*

*means for subtracting said currency debit amount from the current amount in said database corresponding to the received customer card number and updating said currency amount in said database.*

*21. The system of claim 20 further comprising:*

*means for transmitting to said second remote terminal an authorization message for transferring said currency debit amount if said currency debit amount is not greater than said currency amount in the database.*

*22. The system of claim 20 wherein said second remote terminal comprises means for transmitting a customer inputted personal identification number.*

*23. The system of claim 20 wherein said second remote terminal comprises means for transmitting a currency code indicating a currency type in said second remote terminal.*

*24. The system of claim 23 further comprising:*

*means for converting said debit currency amount from said currency type to an issuance currency of said card.*

*25. The system of claim 19 wherein said card number comprises a bank identification number.*

*26. The system of claim 19 wherein said plurality of fields of said database includes a field for a bank identification number.*

*27. The system of claim 19 wherein said each of said cards comprises a printer serial number different from said customer number for said card.*

*28. A computer readable medium including computer program code for creating a customer account for distributing currency or purchasing goods and services using cards, each card having a serial number printed on the card and an account number encoded in the card, said computer readable medium comprising:*

*computer program code for loading an account number for a card into a database having a plurality of fields, including fields for said account number, for customer data, and for currency amount, leaving said fields for customer data and currency amount without customer data or currency amount, said account number being associated with said serial number of the card;*

*computer program code for receiving, at a subsequent time of purchase of the card, customer data, said serial number, and a currency amount, from a first remote terminal; and*

*computer program code for looking-up an account number from said serial number and for entering said customer data and said currency amount into said fields of said database for said customer data and said currency amount, respectively, corresponding to said account number.*

*29. The computer readable medium of claim 28 wherein said computer readable medium further comprises:*

*computer program code for subsequently receiving, from a second remote terminal, a account number from a card and a currency debit amount;*

*computer program code for transmitting to said second remote terminal an authorization message for transferring said currency debit amount if said currency debit amount is not greater than said currency amount in said database corresponding to the account number; and*

*computer program code for subtracting said currency debit amount from the currency amount in said database corresponding to the account number and updating said currency amount in said database.*

*30. The computer readable medium of claim 29 wherein said computer readable medium further comprises:*

*computer program code for transmitting to said second remote terminal a message denying the transferring of currency if said currency debit amount is greater than the currency amount in the database.*

*31. The computer readable medium of claim 29 wherein said computer program code for receiving from a second remote terminal a card number and a currency debit amount includes computer program code for receiving a personal identification number from said second remote terminal.*

*32. The computer readable medium of claim 29 wherein said computer readable medium further comprises:*

*computer program code for transmitting, from said second remote terminal, a currency code indicating a currency type in said second remote terminal;*

*computer program code for comparing said currency type to an issuance currency of said card; and*

*computer program code for converting said debit currency amount of said currency to said issuance currency.*

*33. The computer readable medium of claim 28 wherein a bank identification number is also encoded in the card.*

*34. The computer readable medium of claim 28 wherein said plurality of fields of said database includes a field for a bank identification number.*

*35. A system for distributing currency or purchasing goods and services using cards, each card having a card number including an account number encoded thereon, said system comprising:*

*a database on a central computer having a plurality of fields, including fields for said account number, for customer data, and for currency amount, said account number being loaded into said database, leaving said fields for customer data and currency amount without customer data or currency amount;*

*a first remote terminal for transmitting customer data, an ID number corresponding to a card number and a currency amount; and*

*computer program code for entering said customer data and said currency amount into said fields of said database for said customer data and said currency amount, respectively, corresponding to an account number included in said card number.*

*36. The system of claim 35 further comprising:*

*a second remote terminal for transmitting a card number from a card for said customer and a debit currency amount;*

*means for subtracting said currency debit amount from the current amount in said database corresponding to the received card number and updating said currency amount in said database.*

*37. The system of claim 36 further comprising:*

*computer program code for transmitting to said second remote terminal an authorization message for transferring said currency debit amount if said currency debit amount is not greater than said currency amount in the database.*

*38. The system of claim 37 further comprising:*

*computer program code for transmitting to said second terminal a message denying the transferring of currency if said currency debit amount is greater than said currency amount in the database.*

*39. The system of claim 36 wherein said second remote terminal comprises computer program code for transmitting a customer inputted personal identification number.*

*40. The system of claim 36 wherein said second remote terminal comprises computer program code for transmitting a currency code indicating a currency type in said second remote terminal.*

*41. The system of claim 40 further comprising:*

*computer program code for converting said debit currency amount from said currency type to an issuance currency of said card.*

*42. The system of claim 35 wherein said card number comprises a bank identification number.*

*43. The system of claim 35 wherein said plurality of fields of said database includes a field for a bank identification number.*

*44. The system of claim 35 wherein said each of said cards comprises a printed serial number different from the card number for said card.*

*45. An apparatus for distributing currency using cards, each card having a card number including an account number encoded thereon, said apparatus comprising:*

*a database on a central computer having a plurality of fields, including fields for said account number, for customer data, and for currency amount, said account number being loaded into said database, leaving said fields for customer data and currency amount without customer data or currency amount; and*

*computer program code for receiving at a subsequent time of purchase of a card and then entering said customer data and said currency amount into said fields of said database for said customer data and said currency amount, respectively, corresponding to an account number included in said card number.*

*46. The apparatus of claim 45 wherein the card has a serial number printed therein, and*

*wherein during the purchase of the card, said computer program for receiving also receives the serial number for the card, not the account number.*

*47. The apparatus of claim 46 wherein said account number is determined during the purchase of the card based on the serial number received and using said database.*

*48. The apparatus of claim 45 wherein said apparatus further comprises:*

*computer program code for subsequently receiving, during a transaction using a card, an account number from the card and a currency debit amount;*

*computer program code for transmitting to an authorization message for transferring said currency debit amount if said currency debit amount is not greater than said currency amount in said database corresponding to the account number; and*

*computer program code for subtracting said currency debit amount from the currency amount in said database corresponding to the account number and updating said currency amount in said database.*

*49. The apparatus of claim 48 wherein said computer readable medium further comprises:*

*computer program code for transmitting a message denying the transferring of currency if said currency debit amount is greater than the currency amount in the database.*

*50. The computer readable medium of claim 48 wherein a bank identification number is also encoded in the card.*

*51. The computer readable medium of claim 50 wherein said plurality of fields of said database includes a field for a bank identification number.*

*52. The computer readable medium of claim 48 wherein said computer program code for receiving an account number and a currency debit amount also receives a personal identification number.*

* * * * *

UNITED STATES PATENT AND TRADEMARK OFFICE

CERTIFICATE OF CORRECTION

PATENT NO. : RE 37,122 E
DATED : April 3, 2001
INVENTOR(S) : Levine et al.

It is certified that error appears in the above-identified patent and that said Letters Patent is hereby corrected as shown below:

Title page,
U.S. Applications:, Item [63], change "Continuation of application No. 08/707,733, filed on Sep. 4, 1996, now Pat. No. Re. 36,365." to:
-- This application is a continuation of U.S. Patent No. Re. 36,365, which is a reissue of U.S. Patent No. 5,477,038. A continuation of this application, now U.S. Patent No. Re. 37,122, was filed on April 2, 2001, as Reissue Application No. 09/826,564. --

Signed and Sealed this

Twenty-second Day of July, 2003

JAMES E. ROGAN
*Director of the United States Patent and Trademark Office*